United States Patent
Müller (10) Patent No.: US 12,104,927 B2
(45) Date of Patent: Oct. 1, 2024

(54) SENSOR FOR DETECTING A POSITION

(71) Applicant: Bourns, Inc., Riverside, CA (US)

(72) Inventor: Peter Müller, Munich (DE)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 17/403,341

(22) Filed: Aug. 16, 2021

(65) Prior Publication Data

US 2022/0057235 A1  Feb. 24, 2022

(30) Foreign Application Priority Data

Aug. 20, 2020 (DE) .......................... 102020121895.8

(51) Int. Cl.
  *G01D 5/14*  (2006.01)
(52) U.S. Cl.
  CPC ..................................... *G01D 5/14* (2013.01)
(58) Field of Classification Search
  CPC ......................................................... G01D 5/14
  See application file for complete search history.

(56) References Cited

U.S. PATENT DOCUMENTS

| | | | | |
|---|---|---|---|---|
| 5,862,691 A * | 1/1999 | Friedrich | ................ | E05B 17/22 70/264 |
| 7,009,386 B2 * | 3/2006 | Tromblee | ............. | G01D 5/2497 324/207.2 |
| 7,402,997 B2 * | 7/2008 | Mouaici | ................. | G01D 5/145 324/207.21 |
| 7,495,432 B2 * | 2/2009 | Kato | ...................... | G01D 5/245 324/207.2 |
| 8,058,868 B2 * | 11/2011 | Santos | .................. | G01D 5/145 310/68 B |
| 8,587,295 B2 * | 11/2013 | Aimuta | .............. | G01D 5/24476 324/207.25 |
| 9,448,054 B2 * | 9/2016 | Nomura | .................. | F02D 11/02 |
| 10,072,944 B2 * | 9/2018 | Klocke | .................... | G01D 5/12 |
| 2012/0038348 A1 | 2/2012 | Aimuta et al. | | |

(Continued)

FOREIGN PATENT DOCUMENTS

| | | |
|---|---|---|
| DE | 102005038516 A1 | 2/2007 |
| DE | 102011056899 A1 | 6/2013 |
| DE | 102013006379 A1 | 10/2014 |

*Primary Examiner* — Walter L Lindsay, Jr.
*Assistant Examiner* — Milton Gonzalez
(74) *Attorney, Agent, or Firm* — Michael Best & Friedrich LLP (57) ABSTRACT

A sensor for detecting a position on a path extending in a path direction, includes a transmitter element having at least one centrally arranged magnet and two magnets arranged at the edge in front of and behind the centrally arranged magnet. The magnetic poles of the magnets are aligned transversely with respect to the path direction to emit a magnetic field which varies in the path direction. The sensor includes a measurement transducer arranged to output a measurement signal dependent on the magnetic field. The transmitter element and the measurement transducer are movable with respect to one another. The sensor includes an evaluation device set up to output, based on the measurement signal, a sensor signal dependent on the relative position between the measurement transducer and the transmitter element. The centrally arranged magnet is arranged to excite a greater magnetic flux than the magnets arranged at the edge.

20 Claims, 7 Drawing Sheets

(56) References Cited

U.S. PATENT DOCUMENTS

| | | |
|---|---|---|
| 2013/0118273 A1 | 5/2013 | Antoni |
| 2013/0154624 A1 | 6/2013 | Taylor |
| 2013/0167660 A1 | 7/2013 | Antoni et al. |
| 2013/0218517 A1 | 8/2013 | Ausserlechner |
| 2016/0146630 A1* | 5/2016 | Takahashi .......... G01D 5/24438 324/207.25 |
| 2018/0340853 A1* | 11/2018 | Berner .................... B62D 6/10 |
| 2020/0370877 A1* | 11/2020 | Bidaux ................. G01R 33/07 |

* cited by examiner

SENSOR FOR DETECTING A POSITION

The present invention relates to a sensor for detecting a position on a path extending in a path direction and to a vehicle with the sensor.

It is a task of the invention to specify a sensor for detecting a position on a path extending in a path direction, which outputs the position to be detected with the smallest possible measurement error.

The task is fulfilled by the characteristics of the independent claim. Preferred embodiments are the subject matter of the dependent claims.

According to one aspect of the invention, a sensor for detecting a position on a path extending in a path direction, comprises a transmitter element having at least one centrally arranged magnet and two magnets arranged at the edge in front of and behind the centrally arranged magnet, as seen in the path direction, the magnetic poles of the magnets being aligned transversely with respect to the path direction and being set up to emit a magnetic field created by the transmitter which varies in the path direction, a measurement transducer which is set up to emit a measurement signal which is dependent on the magnetic field created by the transmitter arriving at the measurement transducer, the transmitter element and the measurement transducer being arranged such that they can move with respect to one another in the path direction, and an evaluation device which is arranged to output, on the basis of the measurement signal, a sensor signal which is dependent on the relative position between the measurement transducer and the transmitter element, the centrally arranged magnet, as seen in the path direction, being arranged to excite a greater magnetic flux than the magnets arranged at the edge.

The specified sensor is based on the idea that a field vector of the magnetic field arriving at the measurement transducer rotates around the transverse axis when the transmitter element moves relative to the measurement transducer, and that the orientation of the field vector arriving at the measurement transducer is a suitable measure to determine the relative position of the transmitter element to the measurement transducer and thus the position to be detected. However, the magnitude of the field vector does not remain constant when viewed over the path. These field vector fluctuations ultimately lead to measurement errors in the position to be detected.

To keep the magnitude of the field vector as constant as possible over the path, as many short magnetic poles as possible could be arranged one behind the other over the path. In measurements, however, it was found that the magnitude of the field vector can also be kept more constant over the path if the magnetic pole arranged in the middle of the transmitter element, viewed over the path direction, is longer than magnetic poles arranged at the ends of the transmitter element, viewed over the path direction.

The specified sensor therefore outputs a position on a path extending in one path direction with a small measurement error. Compared to a transmitter element in which a large number of short-distance magnetic poles have to be arranged in order to keep the field vector as constant as possible, the specified sensor makes do with significantly fewer magnetic poles and can therefore also be manufactured more cheaply and with less installation space required.

In an embodiment of the specified sensor, the centrally arranged magnet for exciting the larger magnetic flux is 30% to 60%, preferably 40% to 50%, particularly preferably 44%, larger than each of the magnets arranged at the edge. If the magnets arranged at the edge are too short in the path direction, they will have too little effect. If they are too long, their effect could not achieve a field vector as constant as possible, as described above. In the given configuration, the effect of the magnets arranged at the edge in interaction with the centrally arranged magnet is optimal for achieving a field vector that is as constant as possible.

In a further embodiment of the specified sensor, one transition magnet is arranged in the transmitter element before and after the centrally arranged magnet, as seen in the path direction, which is followed by the magnets arranged at the edge, as seen in the path direction. In interaction with the centrally arranged magnet, the transition magnets encode the path and provide a higher resolution of the positions that can be detected via the path.

In a particular embodiment of the specified sensor, the transition magnet is smaller than or equal to the centrally arranged magnet, but larger than the magnets arranged at the edge. In this way it is ensured that the abovementioned effect of obtaining a field strength that is as constant as possible over the path is achieved.

In a preferred embodiment of the specified sensor, a measurement range for detecting the position as seen in the path direction lies between the transition magnets. This embodiment is based on the idea that the magnitude of the field strength vector will always change considerably towards the edges of the transmitter element seen in the path direction. The highest possible constancy of the field strength vector is mainly achieved towards the centre of the transmitter element seen in the path direction. This is why the centre of the transmitter element is a particularly favourable location to exploit the idea behind the specified sensor.

In another embodiment, the specified sensor comprises a further measurement transducer which is arranged in front of or behind the measurement transducer, as seen in the path direction, and is set up to output a further measurement signal which is dependent on the magnetic field created by the transmitter arriving at the measurement transducer, the transmitter element and the further measurement transducer being arranged such that they can move with respect to one another in the path direction, and the evaluation device being set up to output the sensor signal based on a difference between the two measurement signals. In this way, interfering mean values can be filtered out of the measurement signal and any error in the position detection can be further reduced.

In a particularly preferred embodiment of the specified sensor, one of the magnets arranged at the edge lies at least partially in a measurement range for detecting the position. Tests have shown that in this range the error of the specified sensor can be significantly reduced once again in conjunction with the aforementioned differential measurement.

In yet another embodiment of the specified sensor, the path direction is a tangential direction, so that the position to be detected is an angular position.

According to another aspect of the invention, a vehicle comprises a chassis movable in a driving direction, two front wheels supporting the chassis at the front as viewed in the driving direction, two rear wheels supporting the chassis at the rear as viewed in the driving direction, a steering wheel for rotating a steering shaft about an axis of rotation for turning the front wheels, one of said sensors for detecting a relative position between a part of the steering shaft facing the steering wheel and a part of the steering shaft facing the front wheels, and a motor for adjusting the turning of the front wheels in accordance with the detected relative position.

The above-described properties, features and advantages of this invention, as well as the manner in which they are achieved, will become clearer in connection with the following description of the embodiments, which are explained in more detail in connection with the drawing, in which.

Figure 1:
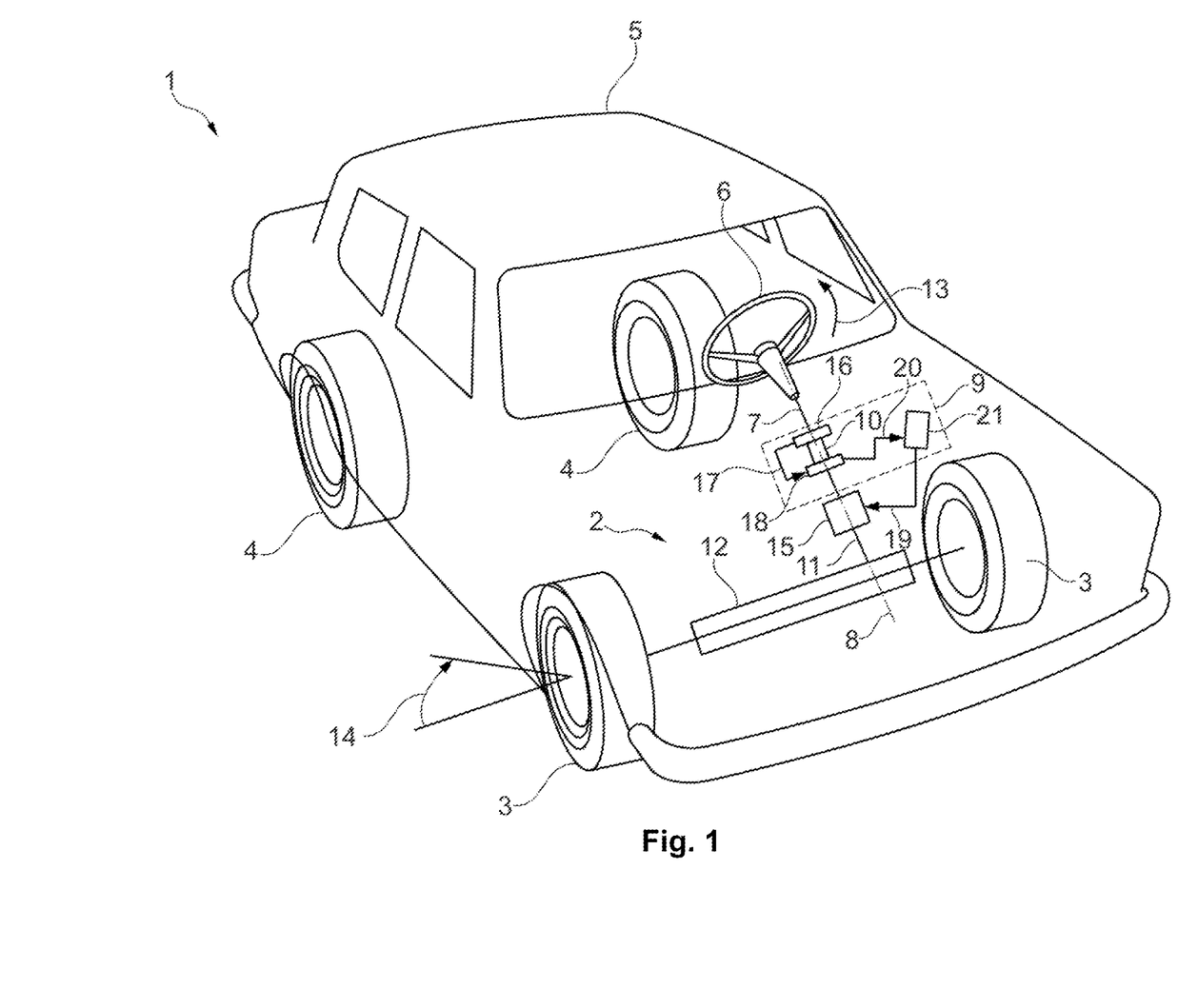
FIG. 1 is a schematic perspective view of a vehicle with a steering system.

Reference is made to FIG. 1, which is a schematic perspective view of a vehicle 1 comprising a steering system 2.

In the present embodiment example, the vehicle 1 comprises a chassis 5 supported by two front wheels 3 and two rear wheels 4. The front wheels 3 can be turned by the steering system 2 so that the vehicle 1 can be driven in a curve.

The steering system 2 comprises a steering wheel 6 which is mounted on a first steering shaft 7 which in turn is mounted pivotably around a rotation axis 8. The first steering shaft 7 is guided into a sensor 9 for detecting a position, here in the form of an angular position, and is connected there to a torsion element 10 in a way that is not specified further. A second steering shaft 11 is connected to said torsion element 10 on the side opposite the first steering shaft 7 on the rotation axis 8, which in turn ends in a steering gear 12. If the steering wheel 6 is turned with a torque in the form of a steering torque 13, the steering torque 13 is transferred accordingly via the steering shafts 7, 11 to the steering gear 12, which, in response, steers the front wheels 3 to drive in a curve with a wheel angle 14.

The steering process is supported by an auxiliary motor 15 which assists the second steering shaft 11 in turning. For this purpose, the steering torque 13 is derived from the relative angular position between the first steering shaft 7 and the second steering shaft 11, which is detected by the sensor 9. The auxiliary motor 15 then steers the second steering shaft 11 inter alia according to the detected steering torque 13.

To detect the abovementioned angular position and thus the steering torque 13, the sensor 9 comprises a magnetic transmitter element 16 which is connected to the first steering shaft 7, and which induces a magnetic field 17. The sensor 9 further comprises a measurement transducer 18 connected to the second steering shaft 11, which receives the magnetic field 17 from the magnetic transmitter element 16 as a function of a relative angular position of the first steering shaft 7 and thus of the magnetic transmitter element 16 to the second steering shaft 11, and forwards a measurement signal 20 dependent on the received magnetic field to an evaluation device 21. The measurement signal 20 thus carries the angular position to be detected as information. The evaluation device 21 determines the relative angular position of the two steering shafts 7, 11 to each other based on the measurement signal 20 and outputs a sensor signal 19 dependent on this, which is thus also dependent on the steering torque 13 due to the elasticity of the torsion element 10. The sensor signal 19 is thus directly dependent on the steering torque 13 to be detected, so that the auxiliary motor 15 can process this information directly to turn the second steering shaft 11.

Figure 2:
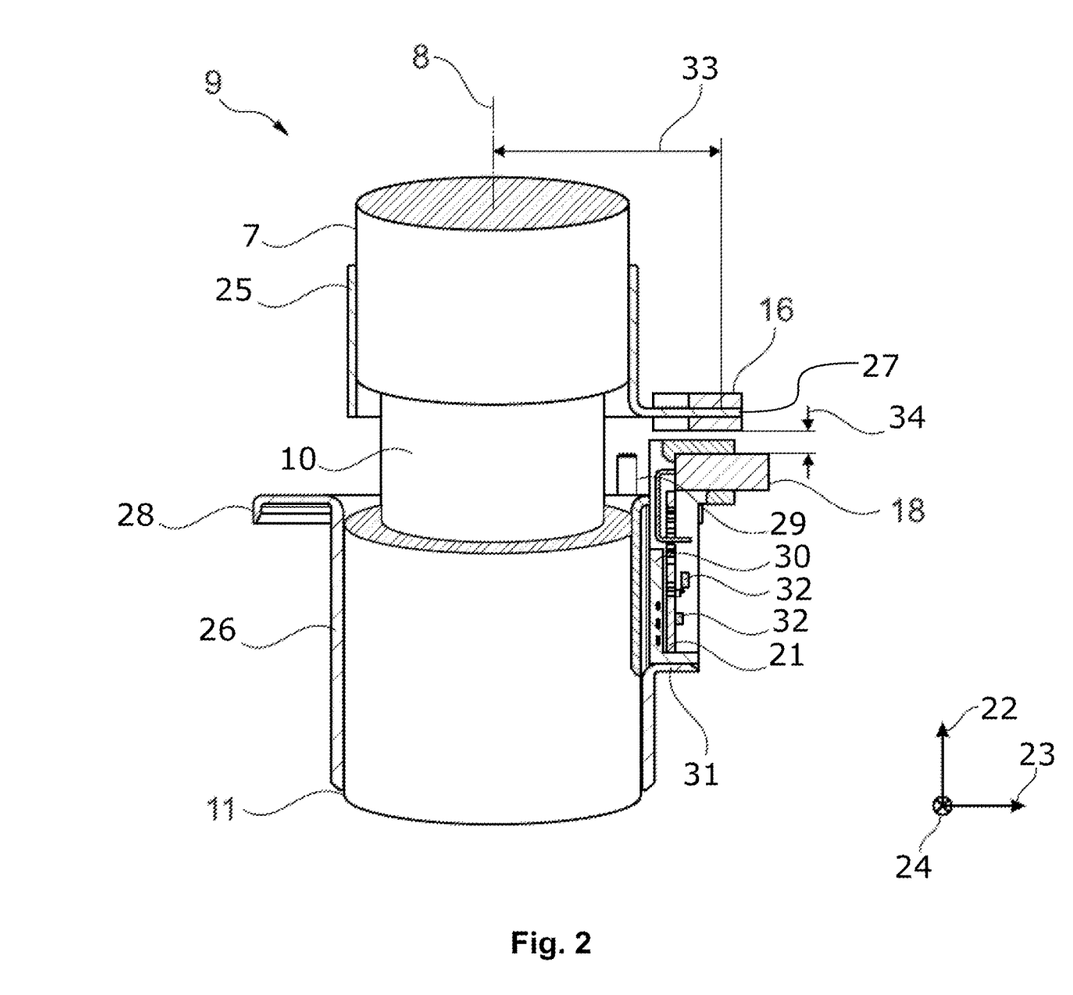
FIG. 2 is a schematic view of a version of a sensor for detecting a position in an application as a torque sensor for the steering system from FIG. 1.

Reference is made to FIG. 2 which shows a version of the sensor 9.

For the description of the sensor 9, a space is assumed in the cylindrical coordinate system which is spanned by an axial direction 22, a radial direction 23 and a circumferential direction 24. The axial direction 22 is aligned in the direction of the axis of rotation 8, while the circumferential direction 24 is aligned circumferentially around the axis of rotation 8. The radial direction 23 extends radially to the axis of rotation 8.

In this cylindrical coordinate system, the sensor 9 comprises a first bearing bush 25 extending around the axis of rotation 8 for force-fit reception of the first steering shaft 7, and a second bearing bush 26 for force-fit reception of the second steering shaft 11.

In this case, the first bearing bush 25 has a retaining member 27 to which the magnetic field transmitter element 16 is attached, for example by means of an adhesive. In this way, the magnetic field transmitter element 16 is held stationary on the first steering shaft 7 when the latter is pressed into the first bearing bush 25.

A carrier 28, here in the form of a flange, is formed on the second bearing bush 26. A printed circuit board holder 30 is held on the carrier 28 by means of a pin 29, which is supported on a floating bearing element 31 on the opposite side as seen in the axial direction 22. The evaluation device 21 in the form of a printed circuit board is accommodated in the printed circuit board holder 30, to which in turn the measurement transducer 18 is electrically and mechanically connected, for example by soldering. The measurement signal 20 from the measurement transducer 18 is processed in the evaluation device 21 by means of electrical components 32, and forwarded as a sensor signal 19 to the auxiliary motor 15 via an interface that is not further visible in FIG. 2.

When the first steering shaft 7 is rotated during operation of the sensor 9, and the rotation is transmitted to the second steering shaft 11 via the torsion element 10, the first bearing bush 25, which is held in a force-fitting manner on the first steering shaft 7, rotates with the magnetic field transmitter element 16, and the second bearing bush 26, which is held on the second steering shaft 11, rotates with the measurement transducer 18. Due to inertia of the second steering shaft 11 and the elasticity of the torsion element 10, the first steering shaft 7 twists relative to the second steering shaft 11 when the first steering shaft 7 is turned. As a result, the magnetic field transmitter element 16 also rotates in relation to the measurement transducer 18 in the circumferential direction 24 as the path direction.

The magnetic field 17 of the magnetic field transmitter element 16 changes over the circumferential direction 24. Therefore, if the magnetic field transmitter element 16 rotates in relation to the measurement transducer 18, the magnetic field 17 arriving at the measurement transducer 18 changes. Since the rotation of the magnetic field transmitter element 16 relative to the measurement transducer 18, and thus the position to be detected by the sensor 9 on the path running in the circumferential direction 24, is dependent on the magnitude of the steering torque 13 due to the elasticity of the torsion element 10, the magnetic field 17 arriving at the measurement transducer 18, the measurement signal 20 and finally the sensor signal 19 are therefore also dependent on the magnitude of the steering torque 13.

Figure 8:
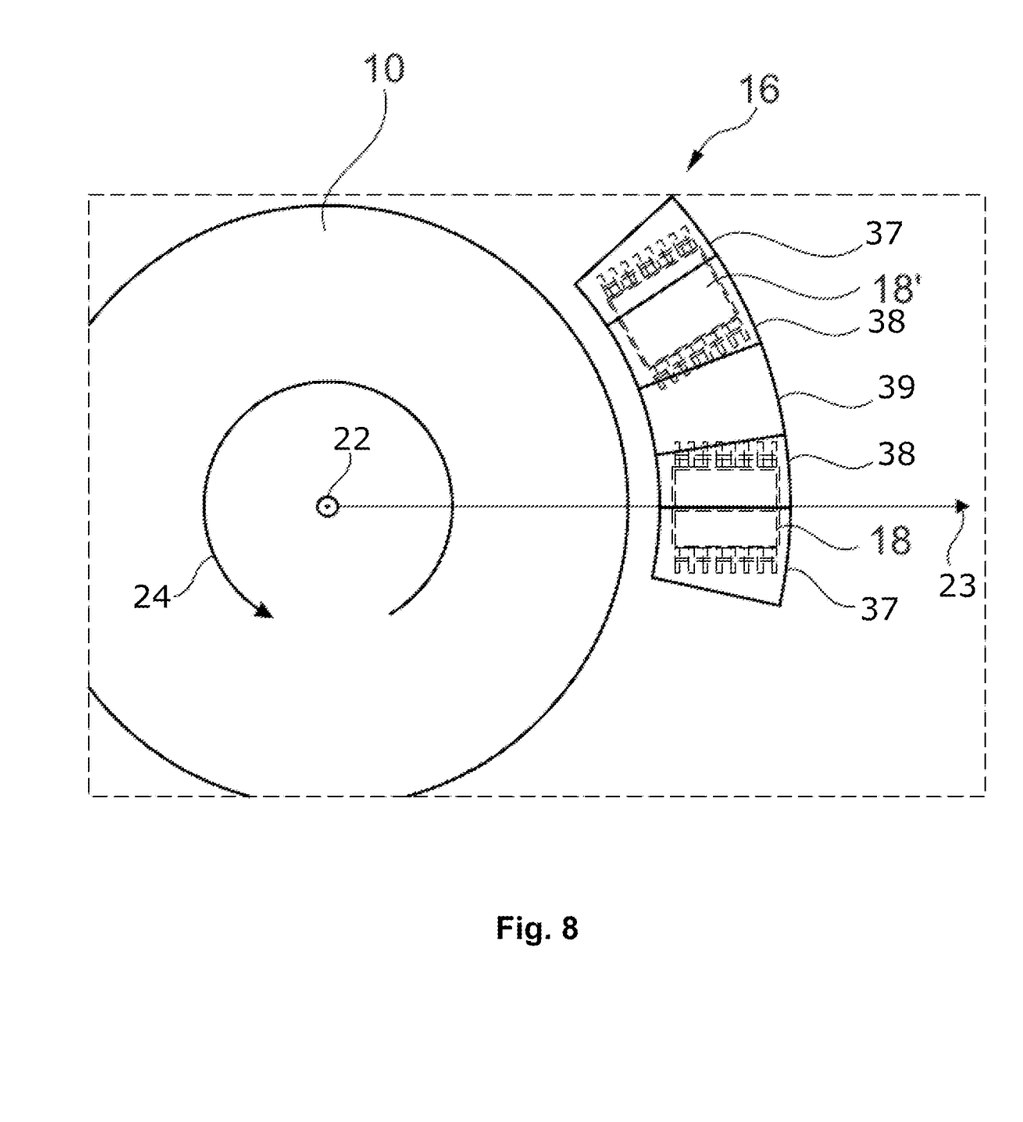
FIG. 8 is a sketch of an embodiment of the torque sensor according to FIG. 3.

The magnetic field transmitter element 16 is designed in the form of a magnetic ring segment which is guided circumferentially around the axis of rotation 8 at a radial ring spacing 33. The measurement transducer 18 is also arranged with the radial ring distance 33 at a distance from the axis of rotation 8, so that the magnetic field transmitter element 16 and the measurement transducer 18 overlap radially when viewed in an axial direction as shown in FIG. 8. In FIG. 2, the centres of these elements in the extension of the radial direction 23 were selected as the reference point for determining the radial ring distance 33 of the measurement transducer 18 and the magnetic field transmitter element 16. In addition to the radial overlap when viewed in an axial direction, the magnetic field transmitter element 16 is arranged at an axial measuring distance 34 from the measurement transducer 18.

The structure of the magnetic field transmitter element 16 is explained in more detail below with reference to FIG. 3 which shows a schematic view of a partial configuration of the previously explained sensor 9 for the steering system from FIG. 1.

The magnetic field transmitter element 16 is here composed of five individual magnets which are lined up in the circumferential direction 24 as the path direction. Each individual magnet is a dipole with a north pole 35 and a south pole 36. The dipoles are oriented across the circumferential direction 24 in the axial direction 22 and thus transversely to the circumferential direction 24. The orientation of successive dipoles in the circumferential direction 24 is reversed in the axial direction 22 in each case, so that the magnetic field transmitter element 16 is set up to emit a magnetic field created by the transmitter that varies in the circumferential direction 24.

The individual magnets located on the outer sides as seen in the circumferential direction 24 are hereinafter referred to as magnets arranged at the ends or edges, while the individual magnets adjoining the magnets arranged at the end or edge 37 are hereinafter referred to as transition magnets 38. All other individual magnets that are opposite the magnets arranged at the end or edge 37 and connected to the transition magnets 38 are referred to below as centrally arranged magnets 39. In the embodiment of FIG. 3, the magnetic field transmitter element 16 has—but is not restricted to—only a single centrally arranged magnet 39.

Figure 3:
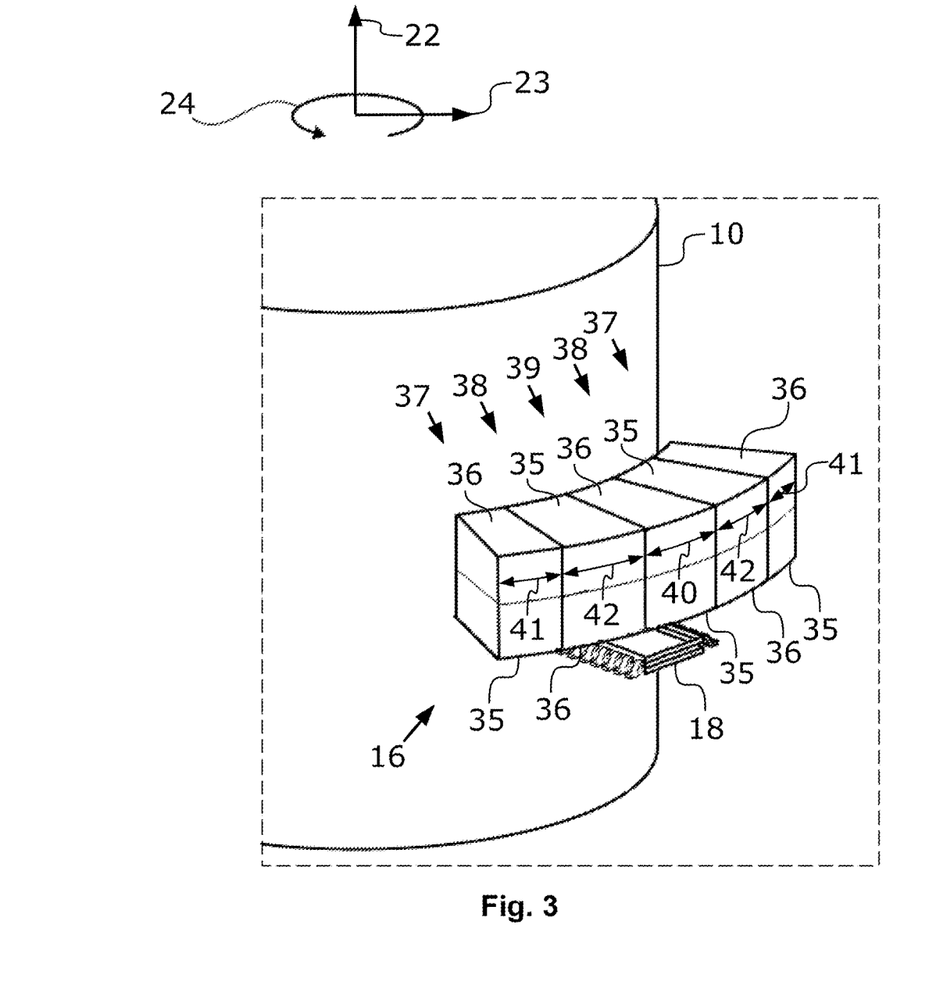
FIG. 3 is a schematic view of a partial configuration of the torque sensor for the steering system from FIG. 1.

In the embodiment of FIG. 3, the individual magnets 37, 38 and 39 have different lengths 41, 42, and 40, respectively, when viewed in the circumferential direction 24 as the path direction. Starting from a length 40 of the centrally arranged magnet 39 seen in the circumferential direction 24, the two magnets_5 arranged at the edge 37 have a length 41 seen in the circumferential direction 24, which is smaller than the length 40 of the centrally arranged magnet. Assuming that the centrally arranged magnet 39 and the two magnets arranged at the edge 37 are equally magnetised, the centrally arranged magnet 39 thus excites a larger magnetic flux than either of the 10 two magnets arranged at the edge 37.

This weaker magnetic flux excitation of the magnets arranged at the edge 37 can, in principle, also be achieved in another way, for example by magnetising the magnets arranged at the edge 37 more weakly than the centrally arranged magnet 39. A combination of the two aforementioned designs for weaker magnetic flux excitation of the magnets arranged at the edge 37 compared to the centrally arranged magnet 39 would also be possible.

The idea behind the weakening of the magnetic flux excitation of the magnets arranged at the edge 37 compared to the centrally arranged magnet 39 will be explained in more detail below with reference to FIGS. 4 to 6.

Figure 4:
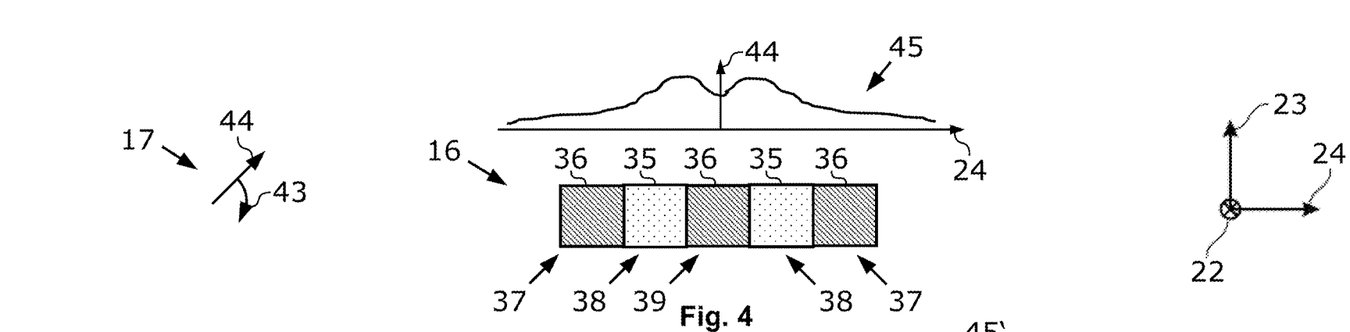
FIG. 4 is a sketch of an alternative possible transmitter element for the torque sensor of FIGS. 2 and 3.

First, FIG. 4 shows the case where all individual magnets 37, 38, 39 excite the same magnetic flux. This means that all individual magnets 37, 38, 39 have the same length and are equally magnetised. This is desirable from an economic point of view because the magnetic field transmitter element 16 can thus be assembled from uniform standard elements.

Reference is made to FIG. 1 above, in which it was explained that the magnetic field 17 arriving at the measurement transducer 18 determines the information in the measurement signal 20 that describes the angular position to be detected. This information should be as linearly related as possible to the angular position to be detected. The phase 43 of the magnetic field 17 arriving at the measurement transducer 18 has proven to be suitable for this purpose, but only under the condition that the magnitude 44 of the magnetic field 17 arriving at the measurement transducer 18 remains constant over the circumferential direction 24.

FIG. 4 shows a curve 45 of the magnitude 44 of the magnetic field 17 arriving at the measurement transducer 18 over the circumferential direction 24 for the magnetic field transmitter element 16, which is composed of a centrally arranged magnet 39, two transition magnets 38 and two magnets arranged at the edge 37, as in FIG. 3, although all the individual magnets 37, 38, 39 excite the same magnetic flux.

Although such a magnetic field transmitter element 16 saves installation space, the course 45 of the magnitude 44 of the magnetic field 17 arriving at the measurement transducer 18 is not constant at any point in the circumferential direction 24, which introduces clear non-linearities into the measurement when the angular position is detected via the phase 43 of the magnetic field 17 arriving at the measurement transducer 18. To correct these non-linearities, filters are necessary, if at all possible, and computing resources are required to implement them.

Figure 5:
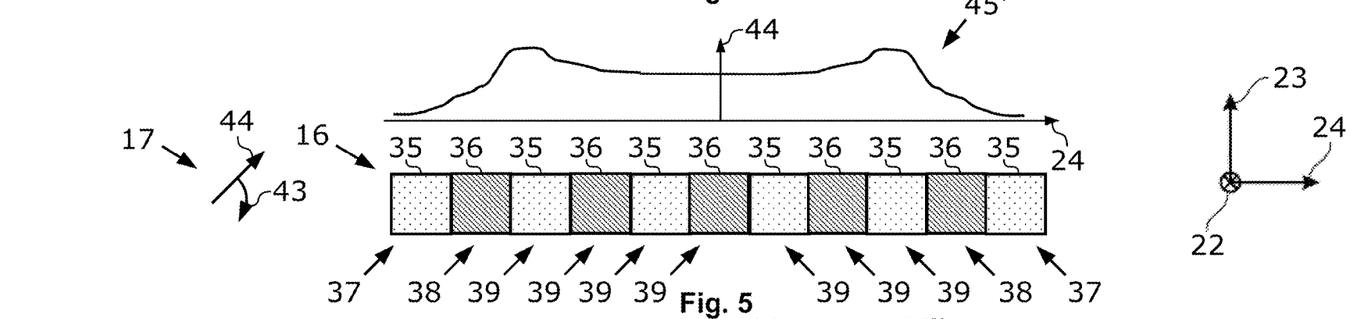
FIG. 5 is a sketch of a further alternative possible transmitter element for the torque sensor of FIGS. 2 and 3.

One way of keeping the magnitude 44 of the magnetic field 17 arriving at the measurement transducer 18 constant in some areas in the circumferential direction 24 is shown in FIG. 5. For this purpose, the magnetic field transmitter element 16 shown in FIG. 4 is simply supplemented by further centrally arranged magnets 39. In this way, the magnitude 44 of the magnetic field 17 arriving at the measurement transducer 18 can be kept constant at least in the area of the innermost centrally arranged magnet 39 seen in the circumferential direction 24. This is indicated by a course 45' above the magnetic field transmitter element 16 of FIG. 5.

However, unnecessary installation space is required for implementation.

Figure 6:
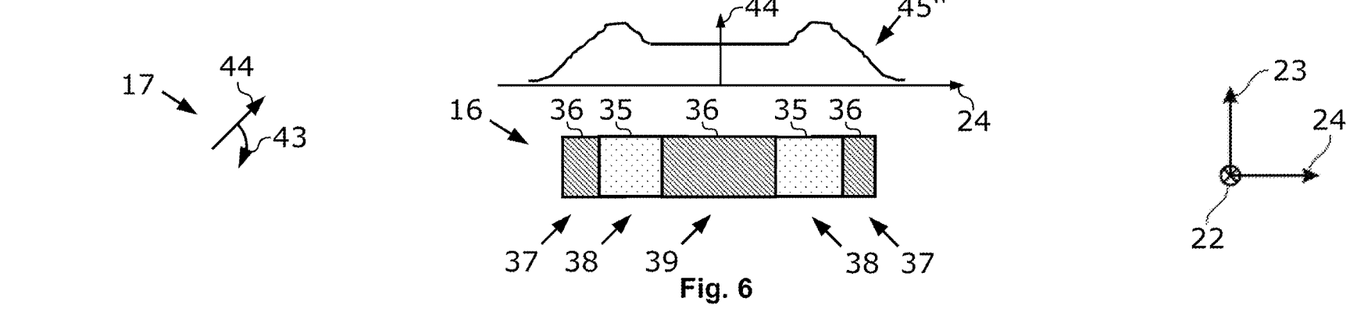
FIG. 6 is a sketch of a yet further alternatively possible transmitter element for the torque sensor of FIGS. 2 and 3.

The alternative solution, which is also implemented in sensor 9 of FIG. 2, is sketched in FIG. 6. Here the centrally arranged magnet 39 is extended in the circumferential direction 24 compared to the magnets arranged at the edge 37, and thus excites a greater magnetic flux than the magnets arranged at the edge. With this solution, the magnitude 44 of the magnetic field 17 arriving at the measurement transducer 18 can be kept constant in the area of the centrally arranged magnet 39. This is indicated by a course 45″ above the magnetic field transmitter element 16 of FIG. 6.

The previously explained idea of keeping the magnitude 44 of the magnetic field 17 arriving at the measurement transducer 18 constant with a non-constant magnetic flux as seen in the circumferential direction 24 will be explained in more detail below by means of a comparison of measurement results shown in FIG. 7.

Figure 7:
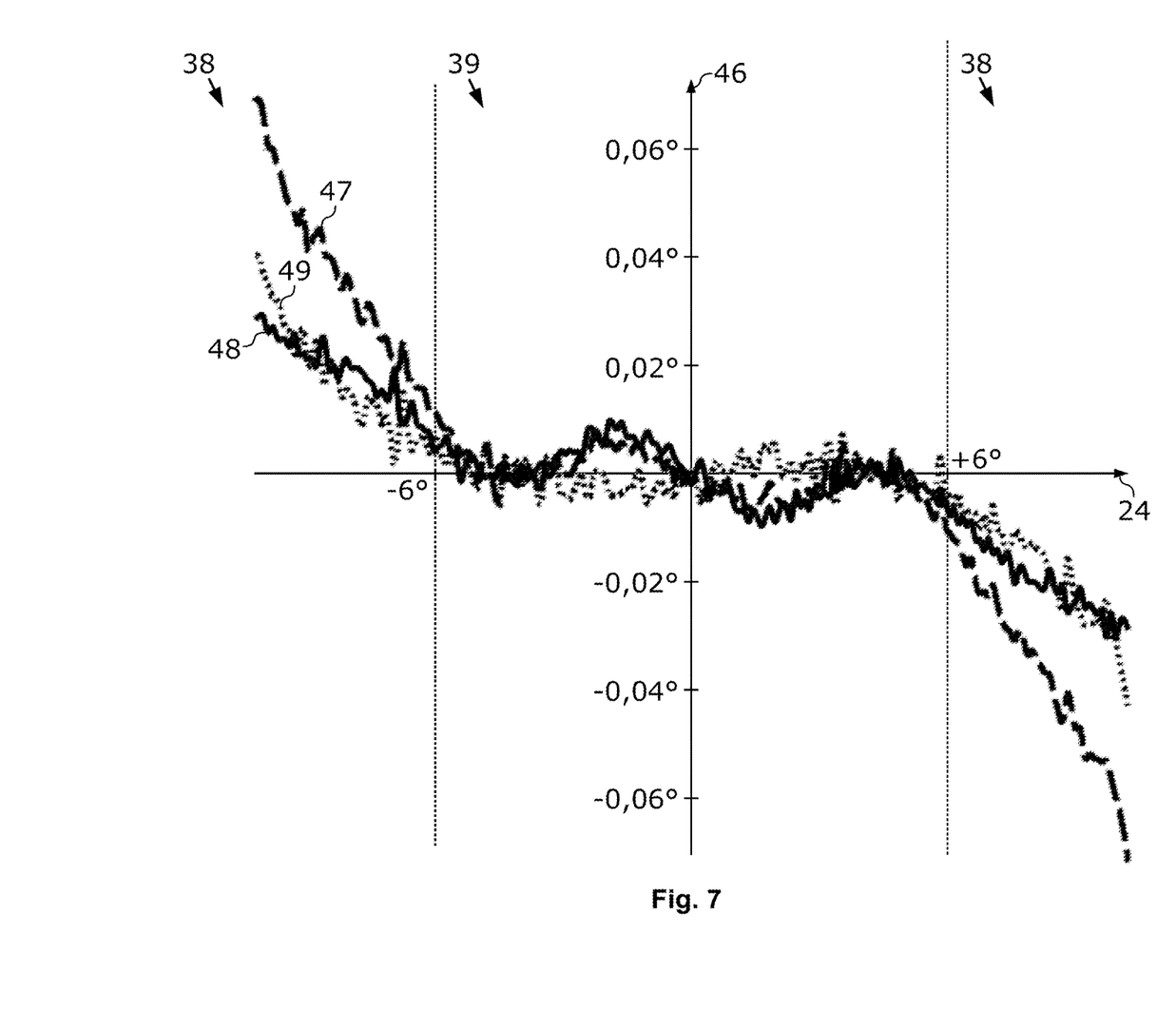
FIG. 7 shows a diagram of the measurement error curve for the transmitter element in the torque sensor according to FIG. 3.

In FIG. 7, error values 46 are plotted in a coordinate system over the circumferential direction 24. To record the error values 46, the second steering shaft 11 was fixed and the first steering shaft 7 was rotated in and against the circumferential direction 24 relative to the second steering shaft 11. In this way, any relative angular position between the first and second steering shafts 7, 11 could be set in the circumferential direction 24.

The error values 46 describe, for an actual relative angular position between the two steering shafts 7, 11 in the circumferential direction 25, a difference from a measured value for this actual relative angular position detected by the sensor 9.

In FIG. 7, error values 46 are plotted with a dashed error curve 47, which resulted when a magnetic field transmitter element 16 according to FIG. 4 was used in the sensor 9. In this magnetic field transmitter element 16, the individual magnets 37, 38 and 39 each had an extension in the circumferential direction 24 of 12°, giving a total extension of 60° in the circumferential direction 24. The magnetic field transmitter element 16 further extended in the radial direction 23 between 15.5 mm and 21.5 mm, and had a height of 5 mm in the axial direction 22. The measurement transducer 18 was positioned at 18.5 mm in the radial direction 23 and 1.5 mm in the axial direction 22 above the magnetic field transmitter element 16.

In FIG. 7, error values 46 are plotted with a solid-line error curve 48, which resulted when a magnetic field transmitter element 16 according to FIG. 3 was used in the sensor 9. In this magnetic field transmitter element 16, the centrally arranged magnet 39 and the transition magnets 38 each had an extension in the circumferential direction 24 of 12°, while the magnets arranged at the edge 37 each had an extension of 9°, again giving a total extension of 54° in the circumferential direction 24. As for the detection of the dashed error curve 47, the magnetic field transmitter element 16 extended further in the radial direction 23 between 15.5 mm and 21.5 mm and had a height of 5 mm in the axial direction 22. The measurement transducer 18 was positioned at 18.5 mm in the radial direction 23 and 1.5 mm in the axial direction 22 above the magnetic field transmitter element 16.

The difference between the dashed error curve 47 and the solid-line error curve 48 is shown with a dotted difference curve 49.

From the comparison of the two error curves 47 and 48, as well as from the difference curve 49, it is immediately apparent that a magnetic field transmitter element 16 with shortened magnets arranged at the edge 37 compared to the centrally arranged magnet 39 can be used over a significantly larger angular range with a comparatively small measurement error, whereby such a magnetic field transmitter element 16 is designed to be even more compact in the circumferential direction 24.

Figure 9:
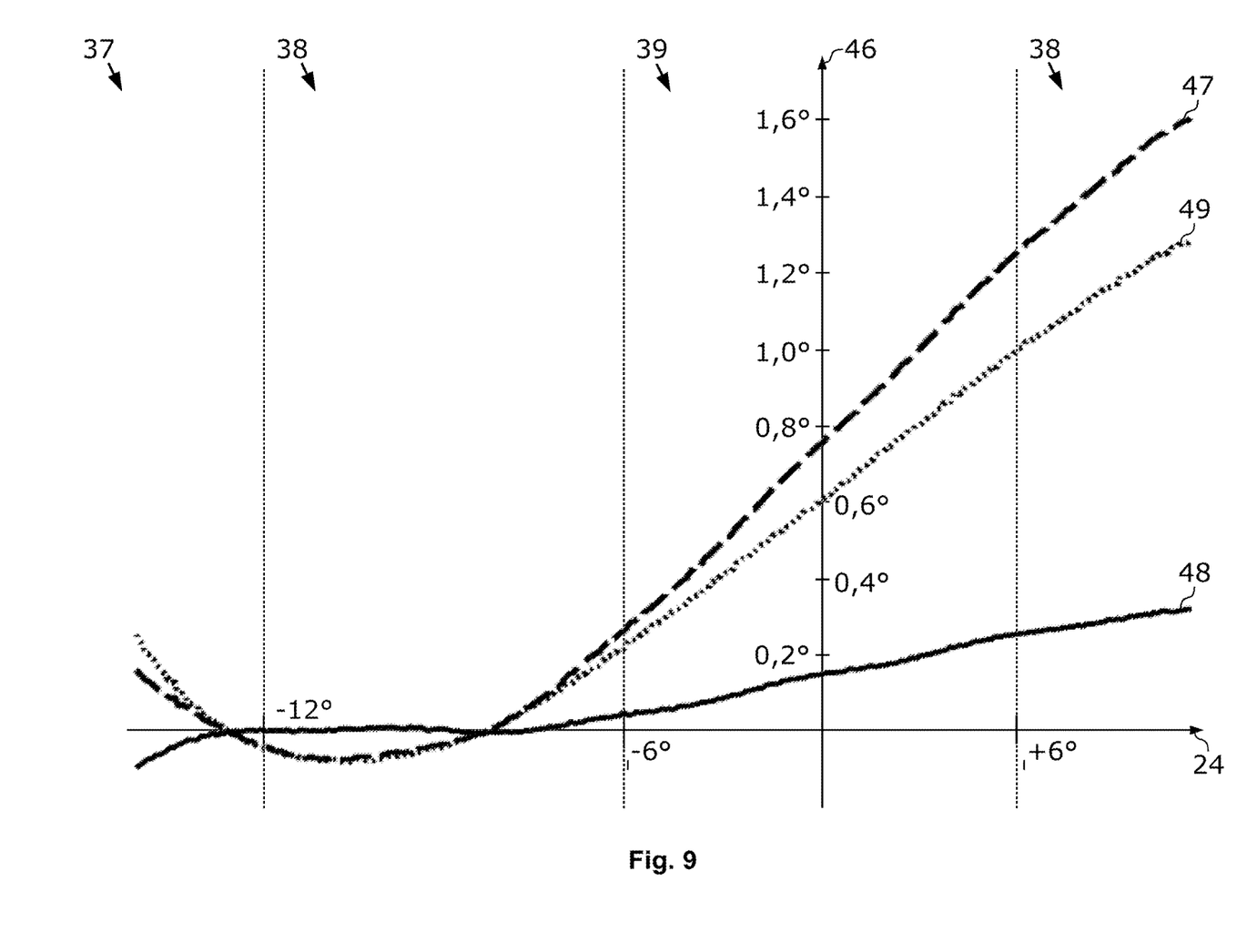
FIG. 9 shows a diagram of the measurement error curve for the transmitter element used according to FIG. 6 in the torque sensor according to FIG. 3, In the drawings, the same technical elements are provided with the same reference signs, and are only described once. The drawings are purely schematic and, in particular, do not reflect the actual geometric proportions.

FIGS. 8 and 9 are used to describe the effect of the magnetic field transmitter element 16 explained in FIGS. 3 to 6 in a differential measurement. For this purpose, the configuration from FIG. 3 is extended by a further measurement transducer 18′, which is spaced from the measurement transducer 18 by 30° in the circumferential direction 24. All other configurations from FIG. 3, in particular the geometric dimensions, have been retained.

In the differential measurement, the measurement signal 20 of one measurement transducer 18 is subtracted from the measurement signal of the other measurement transducer 18′, which is not shown in the figures, to determine the sensor signal 19. Analogously to FIG. 7, the error curves 47 and 48 and the difference curve 49 for the differential measurement of the relative angular position between the two steering shafts 7, 11 are plotted in FIG. 9.

From the error curves 47 and 48 and the difference curve 49 it is immediately apparent that the error in the area of the rear transition magnet 38 seen in the direction of rotation 24 towards the magnet arranged at the edge 37 can almost be cancelled out with the use of a magnetic field transmitter element 16 with attenuated magnets arranged at the edge 37 in the magnetic flux.

The invention claimed is:

1. A sensor (9) for detecting an angle position on a path extending in a path direction (24) in a circumferential direction around a rotation axis (8), comprising:
   a transmitter element (16) having a centrally arranged magnet (39) and two magnets arranged at ends in front of and behind the centrally arranged magnet (39), as seen in the path direction (24), the magnetic poles (35, 36) of the magnets (37, 39) being aligned transversely (22) with respect to the path direction (24) and being set up to emit a magnetic field (17) created by the transmitter element (16) which varies in the path direction (24),
   a measurement transducer (18) which is arranged to output a measurement signal (20) which is dependent on the magnetic field (17) created by the transmitter element (16) arriving at the measurement transducer (18), the transmitter element (16) and the measurement transducer (18) being arranged so as to be movable with respect to one another in the path direction (24),
   wherein the measurement transducer (18) is arranged overlapping and with an axial measurement distance to the transmitter element (16), and
   an evaluation device (21) which is set up to output, based on the measurement signal (20), a sensor signal (19) which is dependent on the relative position between the measurement transducer (18) and the transmitter element (16),
   wherein, viewed in the path direction (24), the centrally arranged magnet (39) is arranged to excite a greater magnetic flux than the magnets arranged at the ends, and
   wherein the centrally arranged magnet (39) for exciting the larger magnetic flux is 30% to 60% larger than each of the magnets arranged at the ends.

2. The sensor (9) according to claim 1, wherein the centrally arranged magnet (39) for exciting the larger magnetic flux is 40% to 50% larger than each of the magnets arranged at the ends.

3. The sensor (9) as claimed in claim 1, wherein one transition magnet (38) is arranged in the transmitter element (16) before and after the centrally arranged magnet (39), as seen in the path direction (24), which are followed by the magnets arranged at the ends, as seen in the path direction (24).

4. The sensor (9) according to claim 3, wherein the transition magnet (38) is smaller or equal to the centrally arranged magnet (39) and larger than the magnets arranged at the ends.

5. The sensor (9) as claimed in claim 4, including a further measurement transducer (18') which is arranged in front of or behind the measurement transducer (18), as seen in the path direction (24), and is set up to output a further measurement signal which is dependent on the magnetic field (17) created by the transmitter element (16) arriving at the measurement transducer, the transmitter element (16) and the further measurement transducer (18') being arranged such that they can move with respect to one another in the path direction (24), and the evaluation device (21) being set up to output the sensor signal (19) based on a difference between the two measurement signals (20).

6. The sensor (9) according to claim 5, wherein one of the magnets arranged at the end lies at least partially in a measurement range for detecting the position.

7. The sensor (9) according to claim 6, wherein the aforementioned magnet arranged at the end and the adjacent transition magnet (38) lie in the measurement range.

8. The sensor (9) as claimed in claim 6, wherein the path direction (24) is a tangential direction, so that the position to be detected is an angular position.

9. The sensor (9) according to claim 3, wherein a measurement range for detecting the position as seen in the path direction (24) lies between the transition magnets (38).

10. A vehicle (1), comprising:
a chassis (5) movable in a driving direction,
two front wheels (3) supporting the chassis (5) at the front as viewed in the driving direction,
two rear wheels (4) supporting the chassis (5) at the rear as viewed in the driving direction,
a steering wheel (6) for rotating a steering shaft (7, 11) about an axis of rotation (8) for turning the front wheels (3),
a sensor (9) as claimed in claim 3 for detecting a relative position between a part (7) of the steering shaft facing the steering wheel (6) and a part (11) of the steering shaft facing the front wheels, and
a motor (15) for adjusting the turning of the front wheels (3) in accordance with the detected relative position.

11. The vehicle (1) according to claim 10, wherein the sensor (9) includes a retaining member (27) for supporting the transmitter element (16) to overlap with the measurement transducer (18) when viewed in an axial direction.

12. The vehicle (1) according to claim 11, wherein a first bearing bush (25) that is force-fit to the steering shaft (7) includes the retaining member (27) projecting outwardly from an edge thereof, wherein the transmitter element (16) is held stationary on the steering shaft (7).

13. The vehicle (1) according to claim 12, wherein the sensor (9) includes transition magnets (38) arranged in the transmitter element (16) before and after the centrally arranged magnet (39), as seen in the path direction (24), which are followed by the magnets (37) arranged at the ends, as seen in the path direction (24), wherein the transition magnets (38) are smaller or equal to the centrally arranged magnet (39) and larger than the magnets (37) arranged at the ends.

14. The vehicle (1) according to claim 13, wherein the sensor (9) includes a further measurement transducer (18') which is arranged in front of or behind the measurement transducer (18), as seen in the path direction (24), and is set up to output a further measurement signal which is dependent on the magnetic field (17) created by the transmitter element (16) arriving at the measurement transducer, the transmitter element (16) and the further measurement transducer (18') being arranged such that they move with respect to one another in the path direction (24), and the evaluation device (21) being set up to output the sensor signal (19) based on a difference between the two measurement signals (20), and wherein a measurement range for detecting the position as seen in the path direction (24) lies between the transition magnets (38).

15. The vehicle (1) according to claim 14, wherein the magnets (37) arranged at the end and the adjacent transition magnets (38) lie in the measurement range, and wherein the path direction (24) is a tangential direction, so that the position to be detected is an angular position.

16. The vehicle (1) according to claim 15, wherein the centrally arranged magnet (39) for exciting the larger magnetic flux is 44% larger than each of the magnets arranged at the ends.

17. The vehicle (1) according to claim 10, wherein the centrally arranged magnet (39) for exciting the larger magnetic flux is 40% to 50% larger than each of the magnets arranged at the ends.

18. The sensor (9) according to claim 1, including a retaining member (27) for supporting the transmitter element (16) to overlap with the measurement transducer (18) when viewed in an axial direction.

19. The sensor (9) according to claim 18, wherein a first bearing bush (25) that is force-fit to a first steering shaft (7) includes the retaining member (27) projecting outwardly from an edge thereof, wherein the transmitter element (16) is held stationary on the first steering shaft (7).

20. The sensor (9) according to claim 1, wherein the centrally arranged magnet (39) for exciting the larger magnetic flux is 44% larger than each of the magnets arranged at the ends.

* * * * *